United States Patent
Casazza

[19]

[11] Patent Number: 6,150,925
[45] Date of Patent: Nov. 21, 2000

[54] CONNECTING DEVICES TO IN-CAR PERSONAL COMPUTERS

[75] Inventor: Jeffrey P. Casazza, Tempe, Ariz.

[73] Assignee: Intel Corporation, Santa Clara, Calif.

[21] Appl. No.: 09/089,984

[22] Filed: Jun. 3, 1998

[51] Int. Cl.[7] .................................................. B60Q 1/00
[52] U.S. Cl. ...................... 340/425.5; 340/426; 340/571; 340/686; 340/687; 340/825.32
[58] Field of Search ................. 340/425.5, 426, 340/568.1, 568.4, 571, 686.1, 686.4, 687, 825.34, 825.31, 825.32; 701/1, 33

[56] References Cited

U.S. PATENT DOCUMENTS

| | | | |
|---|---|---|---|
| 4,720,700 | 1/1988 | Seibold et al. | 340/568 |
| 4,985,695 | 1/1991 | Wilkinson et al. | 340/571 |
| 5,406,261 | 4/1995 | Glenn | 340/571 |
| 5,557,254 | 9/1996 | Johnson et al. | 340/426 |
| 5,794,164 | 8/1998 | Beckert et al. | 701/1 |
| 5,821,868 | 10/1998 | Kuhling | 340/649 |
| 5,872,515 | 2/1999 | Ha et al. | 340/571 |
| 5,896,497 | 4/1999 | Halstead | 395/186 |
| 5,957,985 | 9/1999 | Wong et al. | 701/33 |
| 5,978,919 | 11/1999 | Doi et al. | 713/202 |

*Primary Examiner*—Daniel J. Wu
*Assistant Examiner*—Tai T. Nguyen
*Attorney, Agent, or Firm*—Trop, Pruner & Hu, P.C.

[57] ABSTRACT

An in-car personal computer system facilitates the addition of peripheral devices using device bays. Components can be removably plugged into the device bay. The device components operate immediately. When components are removed, the user is prompted to determine whether or not all files have been closed. In addition, the user can be prompted for a removal authorization. If the code is not forthcoming, an alarm can be activated, for example by operating the horns or lights of the vehicle.

8 Claims, 3 Drawing Sheets

CONNECTING DEVICES TO IN-CAR PERSONAL COMPUTERS

BACKGROUND

This invention relates generally to personal computers designed for use in motor vehicles.

There is an increasing interest in providing computer functions, including entertainment, navigation, and internet access, through computer systems installed in motor vehicles. The computer system can be used to present global positioning system information for navigation purposes. It can also be used to provide trip routing information. However, the in-car personal computer is also useful in providing enhanced audio and video capabilities. For example, the in-car personal computer can be used to control compact disk (CD) changers, television programming and digital video disk (DVD) players. The in-car personal computer can also be used to provide added safety functions. For example, a video camera may be utilized to avoid collisions.

Because of the limited space available in the car, aftermarket installation of additional devices can be difficult. Conventional wiring harnesses are generally difficult to access and the space limitations provide limited opportunities for positioning additional devices. Historically providers of in-car personal computers systems have used proprietary connection systems. These proprietary connection systems may be adapted to the particular applications which the manufacturer intends to provide for its in-car personal computer system.

Thus, there is a continuing need for a connection system which facilitates the connection of devices to an in-car personal computer system.

SUMMARY

In accordance with one aspect, an in-car computer system includes a processor and a bus coupled to the processor. A device bay is coupled to the bus.

DETAILED DESCRIPTION

Figure 1:
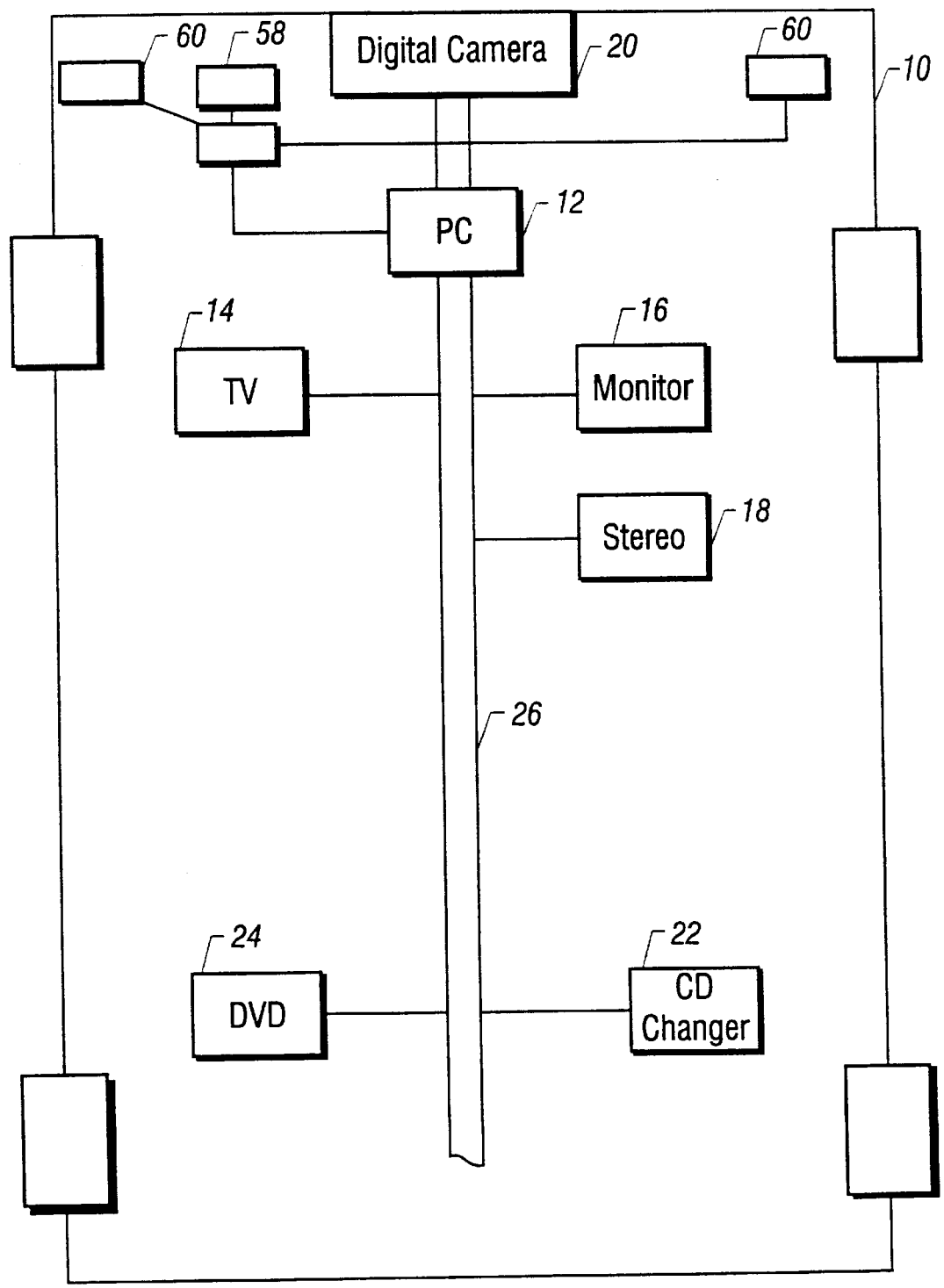
FIG. 1 is a schematic depiction of an in-car computer system in a motor vehicle.

Referring to FIG. 1, a motor vehicle 10 may have a personal computer 12 mounted therein. The personal computer may be provided with its own power source or may be coupled to the vehicle's battery. The personal computer 12 may be completely separate from the automotive electronics, including any microcontrollers used to control engine operation. The personal computer 12 is coupled by a bus 26 to a variety of electronic devices including a television tuner 14, a display 16, a stereo 18, a digital camera 20, a CD changer 22 and a DVD player 24.

In this way, the personal computer 12 can operate a variety of automotive entertainment and navigation functions in addition to traditional computer functions. For example, the personal computer 12 could be adapted to provide internet access through an RF link, such as a cellular phone. The personal computer 12 can provide advanced television tuner functions including digital television and automated program selection. A television picture may be displayed on the display 16. The display 16 may also display the image from a front or rear mounted digital camera 20 which may be used for collision avoidance. Likewise, the car stereo system 18 may be operated through the personal computer 12 to achieve additional functions, such as automated selection of desired programming. The same functions may be provided by the computer to the CD changer 22 and DVD player 24 also coupled to the personal computer via the bus 26. The personal computer 12 may also be coupled to the vehicle's horn 58 and lights 60 through the interface 56.

Figure 2:
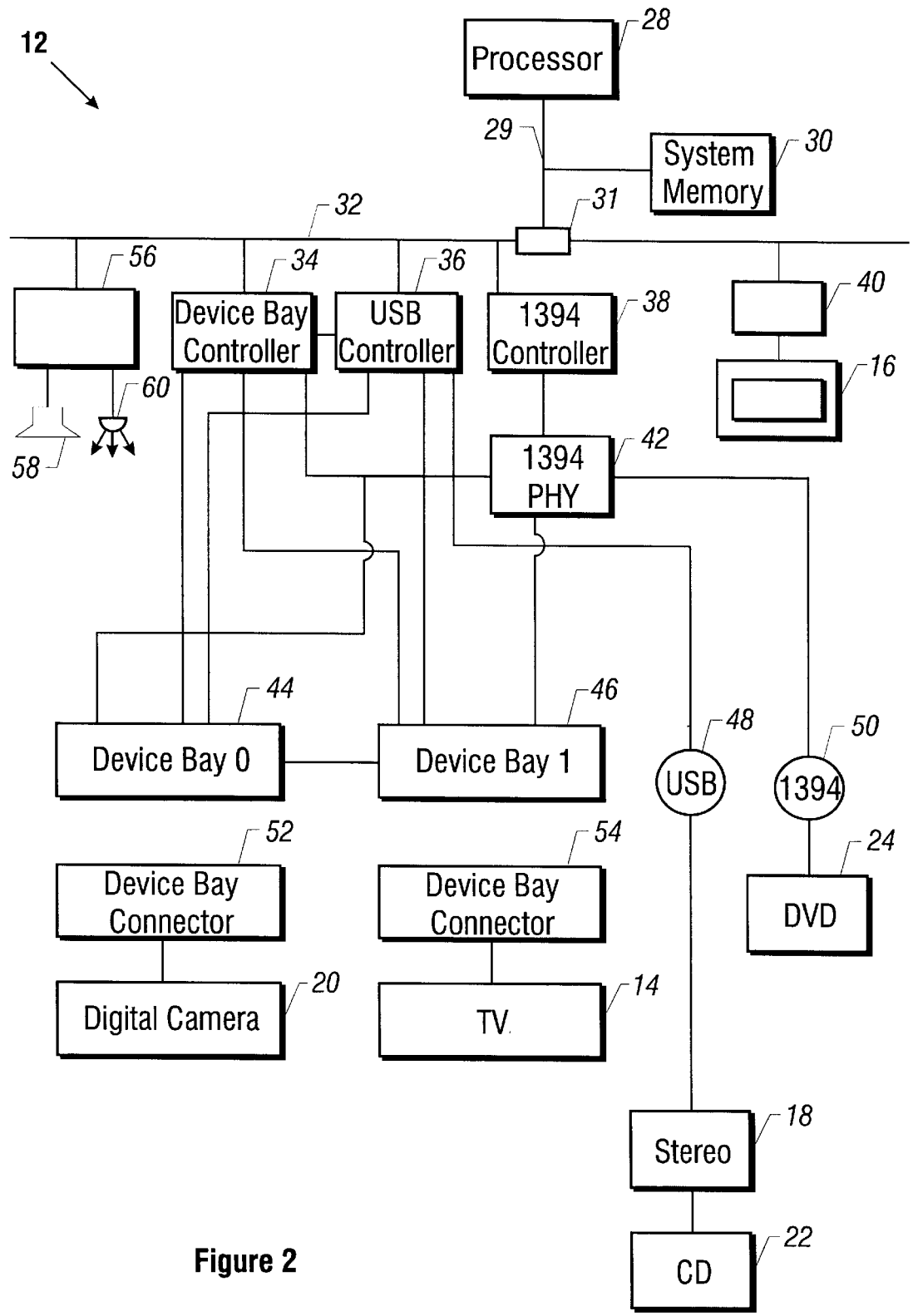
FIG. 2 is a block diagram of the in-car computer system shown in FIG. 1.

Referring now to FIG. 2, the personal computer 12 includes a processor 28 which may be an Intel microprocessor such as the PENTIUM II® microprocessor. The processor 28 is coupled by a host bus 29 to system memory 30. A bridge 31 may connect the bus 29 to a bus 32. The bus 32 may be a Peripheral Component Interconnect (PCI) bus which operates, for example, according to version 2.1 of PCI Bus specification available from the PCI Special Interest Group, Portland, Org. 97214.

The bus 32 may in turn be connected to a device bay controller (DBC) 34. The DBC 34 may operate in accordance with the Device Bay Interface Specification, Revision 0.85, Feb. 6, 1998. The DBC 34 may allow device insertion, device removal upon request, device enumeration, staged power consumption and mapping of Universal Serial Bus (USB) and 1394 ports to device bays. "1394" refers to the IEEE 1394–1995 and 1394b, IEEE Standard for High Performance Serial Bus and Supplement, The Institute of Electrical and Electronic Engineers, Inc., New York, N.Y.

The DBC 34 may discourage the user from removing a device without first making a removal request. Removal requests enable the operating system to do whatever is necessary to insure the integrity of user data applications and the operating system. The DBC 34 may be implemented as part of a serial bus hub function, as a stand alone device, or as an integral part of a system-based chip set.

The DBC 34 communicates with a USB controller 36 which is also connected to the bus 32. The USB controller 36 operates in connection with the Universal Serial Bus specification, Version 1.0, available from the Universal Serial Bus Implementor's Forum (http://www.usb.org). The USB controller 36 operates in a spoke and hub configuration and may control a variety of devices connected to a USB bus. In general, lower speed information may be provided through the USB controller 36.

A 1394 controller 38 is also coupled to the bus 32 and operates in accordance with the 1394–1995 specification. The 1394 controller 38 is coupled to the 1394 physical layer (PHY) 42 which in turn connects to the DBC 34. The 1394 PHY 42 includes the 1394 drivers and receivers.

The 1394 PHY 42, the USB controller 36 and the DBC 34 all connect to the illustrated device bays 44 and 46. While two device bays are illustrated, any number of device bays may be utilized. The device bays 44, 46 operate in accordance with the Device Bay Interface Specification. The device bays provide devices and bays under a standardized and interchangeable environment. Through the industry specification, a mechanism is defined for both peripheral devices and system bays that allows adding and upgrading personal computer peripheral devices without opening the chassis.

Each of the controller 36 and the PHY 42 are also coupled to an additional connector, connector 48 in the case of USB controller 36 and connector 50 in case of PHY 42. These allow additional devices to be coupled through either the USB or 1394 systems. In general, higher speed devices are coupled through the 1394 PHY 42 to the 1394 controller 38. Lower speed operation may be implemented by the USB controller 36.

Each of the device bays can selectively operate either through the USB or the 1394 system (or both 1394 and USB systems) under the control of the DBC 34. The connection to the device bays 44 and 46 is implemented by a device bay connector set associated with each device bay, such as the connector set 52 or 54. Each device bay connector set includes a plug connector that provides a removable device and a receptacle connector that resides in the bay. The device bay connector set 52, 54 may have four pin groups including 1394, USB, power and miscellaneous bay management signals to interface to the DBC 34.

A variety of different devices may be connected to the device bay connectors 52 and 54 in a removable fashion. In the illustrated embodiment, a digital camera 20 is connected to a device bay connector set 52 which operates in conjunction with the 1394 controller 38. Similarly, the TV 14 is coupled to the device bay connector set 54 which may also be operated through the 1394 controller 38. Likewise, a stereo 18 and CD changer 22 are coupled to the USB connector 48 and a DVD player 24 is shown coupled to a 1394 connector 50.

A virtually limitless variety of peripheral devices can be connected either through the device bays or through separate USB and 1394 connectors to facilitate easy connection to the computer system. The use of the device bay configuration in an in-car personal computer is advantageous because it facilitates upgrading, replacement and adding of devices to an in-car personal computer system. Because of the difficulty in adding and upgrading the existing system, this is a significant advantage.

Moreover, the devices may be inserted into the bays and they are automatically configured. The end user can then immediately begin using the newly configured device. This allows the user to attach computer components in the car from a home or business personal computer system to his or her in-car computer system. The user can simply plug the component into the in-car personal computer system, use the system during the operation of the vehicle, and thereafter remove the component and return it to its original computer system.

The device bay insures that a device plugged into the bay operates properly. This includes a variety of consumer electronic devices that can be driven through the device bay. Moreover, because of the device bay arrangement, the user can easily reconfigure his or her in-car personal computer system by simply replacing components with additional components.

Each device bay also implements a software control physical interlock that enables security features. When a user attempts to remove a device, a device bay enabled operating system uses a software control interlock to make sure that all open files have been closed before the user is able to remove the device. A security feature can be provided which prevents theft of components from an in-car personal computer.

When someone attempts to remove a component from the in-car computer system, a query is made as to whether or not the person removing the device has authorization. For example, the person can be asked to enter a password. If the person fails to enter the password and removes the device, an alarm is initiated. For example, the personal computer 12 may drive the horns and/or lights 58, 60 when an alarm condition is sensed.

Figure 3:
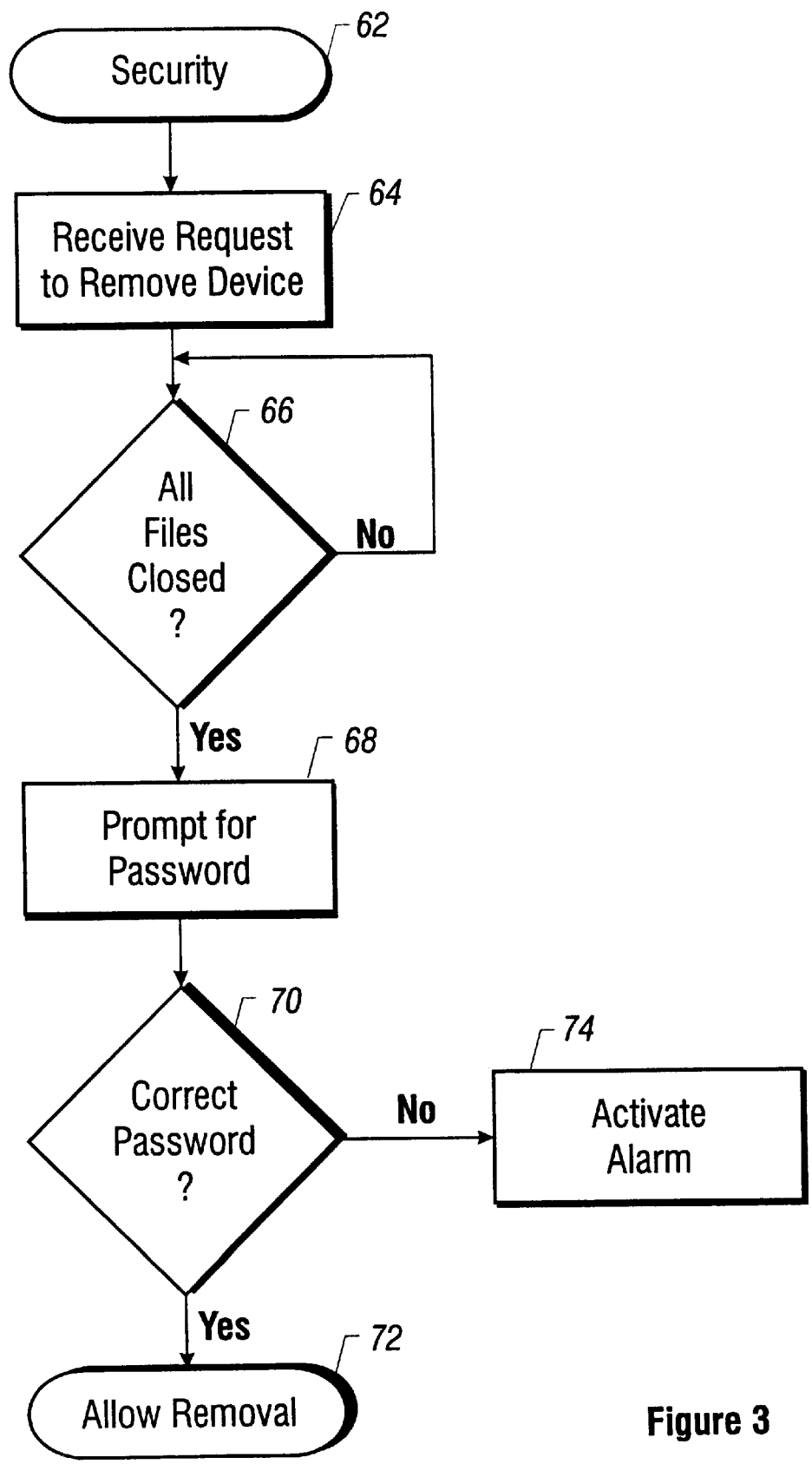
FIG. 3 is a flow diagram for the system shown in FIG. 1.

Referring then to FIG. 3, a security program 62 may be implemented when a request to remove a device from a device bay is received, as indicated as step 64. The program may be stored on a computer readable storage medium such as a hard disk, a floppy disk, a compact disk or a semiconductor memory, for example. An inquiry is made as to whether all existing files have been closed at diamond 66. If not, the flow pauses at this point. When all files have been closed, the user is prompted for a password at step 68. The request may appear on the display 16. If the correct password is received at diamond 70, the device may be removed, as indicated at step 72. Otherwise, an alarm is activated, as indicated at 74.

While the present invention has been described with respect to a limited number of preferred embodiments, those skilled in the art will appreciate numerous modifications and variations therefrom. It is intended that the appended claims cover all such modifications and variations as fall within the true spirit and scope of the present invention.

What is claimed is:

1. A method of protecting components in an in-car personal computer system from theft comprising:

monitoring a device bay for the removal of a peripheral device from the computer system; and when the removal of a device is detected, requesting an authorization code.

2. The method of claim 1 including activating an alarm if the authorization code is not provided.

3. The method of claim 2 including activating the motor vehicle horn.

4. The method of claim 3 including determining whether all files have been closed before allowing removal of a peripheral device.

5. An in-car computer system comprising:

a processor;

a bus coupled to the processor; and a device bay coupled to the bus to pluggingly receive a peripheral device and to require a removal request in order to remove a peripheral device from said device bay of said in-car computer system.

6. The system of claim 5 wherein said device bay automatically configures peripheral devices inserted into said bay.

7. The system of claim 5 wherein said device bay requires an authorization code to remove a peripheral device from said bay.

8. The system of claim 6 including an alarm that is activated if a peripheral device is removed from said device bay without making a removal request.

* * * * *